US011106408B2

(12) United States Patent
Kanamori

(10) Patent No.: US 11,106,408 B2
(45) Date of Patent: Aug. 31, 2021

(54) PRINTING CONTROL APPARATUS, CONTROLLING METHOD, AND A STORAGE MEDIUM

(71) Applicant: CANON KABUSHIKI KAISHA, Tokyo (JP)

(72) Inventor: Hideyuki Kanamori, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/659,974

(22) Filed: Oct. 22, 2019

(65) Prior Publication Data
US 2020/0133600 A1 Apr. 30, 2020

(30) Foreign Application Priority Data

Oct. 29, 2018 (JP) .............................. JP2018-202765

(51) Int. Cl.
G06F 3/12 (2006.01)
G06K 15/02 (2006.01)

(52) U.S. Cl.
CPC .......... G06F 3/1247 (2013.01); G06F 3/1206 (2013.01); G06F 3/1255 (2013.01); G06F 3/1258 (2013.01)

(58) Field of Classification Search
None
See application file for complete search history.

(56) References Cited

U.S. PATENT DOCUMENTS

| 2003/0069921 | A1* | 4/2003 | Lamming | G06F 16/9577 709/203 |
| 2004/0130740 | A1* | 7/2004 | Lawrence | G06F 3/1232 358/1.13 |
| 2006/0279781 | A1* | 12/2006 | Kaneko | G06F 3/1204 358/1.15 |
| 2007/0273913 | A1* | 11/2007 | Nakata | G06F 21/608 358/1.14 |
| 2008/0019290 | A1* | 1/2008 | Suzuki | H04L 12/66 370/254 |
| 2008/0240605 | A1* | 10/2008 | Enjuji | H04N 5/243 382/274 |
| 2009/0245144 | A1* | 10/2009 | Chida | H04M 1/2535 370/271 |
| 2011/0188065 | A1* | 8/2011 | Hadano | G06F 3/12 358/1.13 |
| 2011/0255115 | A1* | 10/2011 | Tokuda | G06F 3/1257 358/1.13 |
| 2012/0212760 | A1* | 8/2012 | Sakura | G06F 3/1204 358/1.13 |
| 2012/0224207 | A1* | 9/2012 | Sueshige | G06F 3/1244 358/1.13 |

(Continued)

FOREIGN PATENT DOCUMENTS

JP 2015508921 A 3/2015

Primary Examiner — Beniyam Menberu
(74) Attorney, Agent, or Firm — Carter, DeLuca & Farrell LLP

(57) ABSTRACT

The present invention provides a highly-convenient function relating to printing. For this purpose, in the case where execution of printing is instructed, a printing control apparatus receives first print data via predetermined printing software and generates second print data interpretable by a printing apparatus based on the first print data and print setting information.

15 Claims, 19 Drawing Sheets

(56) References Cited

U.S. PATENT DOCUMENTS

| | | | |
|---|---|---|---|
| 2013/0148155 A1* | 6/2013 | Kitagata | G06F 3/1272 358/1.15 |
| 2015/0277827 A1* | 10/2015 | Oonami | G06F 3/1232 358/1.15 |
| 2020/0104657 A1* | 4/2020 | Sato | G06K 15/005 |

* cited by examiner

110

PRINTER 30 CAN USE OS STANDARD PRINTING FUNCTION WITHOUT USING PRINTING CONVERSION UTILITY.

PRINTER IS UPDATED AND CAN USE OS STANDARD PRINTING WITHOUT USING PRINTING CONVERSION UTILITY

PRINTER CAN BE CHANGED NOT TO USE PRINTING CONVERSION UTILITY IN FOLLOWING STEPS.

1. PLEASE DISABLE PRINTER 30 IN SETTING SCREEN OF TARGET PRINTERS OF PRINTING CONVERSION UTILITY.

2. PLEASE TEMPORARILY DELETE PRINTER 30 IN PRINTER LIST SCREEN.

3. PLEASE ADD PRINTER 30 AGAIN IN PRINTER LIST SCREEN..

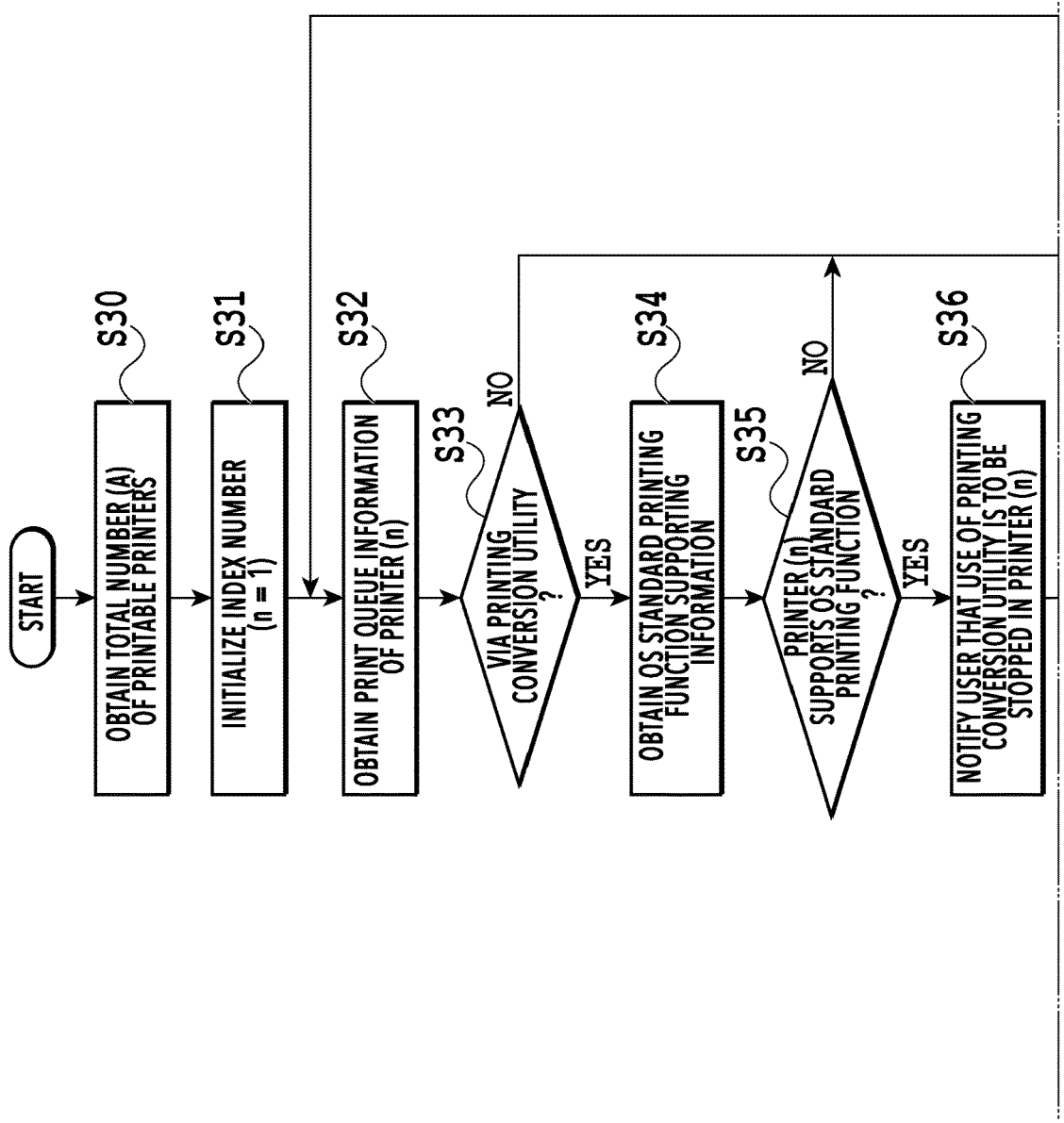

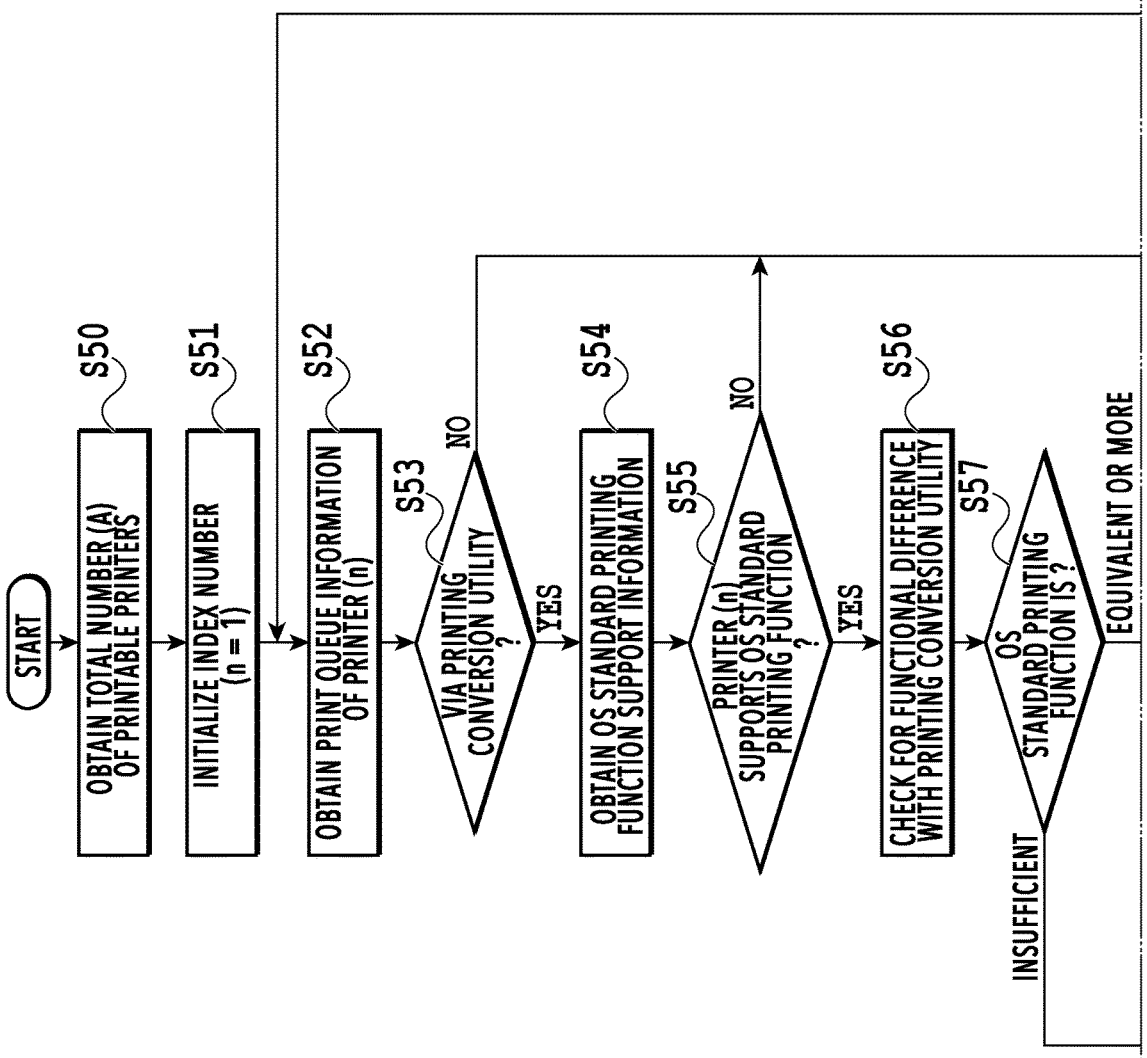

| FIG.15A |
|---|
| FIG.15B |

PRINTING CONTROL APPARATUS, CONTROLLING METHOD, AND A STORAGE MEDIUM

BACKGROUND OF THE INVENTION

Field of the Invention

The present invention relates to a printing control apparatus, a controlling method, and a storage medium in which print processing is switched depending on a condition of a printer.

Description of the Related Art

Japanese Patent Laid-Open No. 2015-508921 discloses a technique of allowing a printer connected to a personal computer to perform printing by using a standard printing function (hereafter referred to as OS standard printing function) provided by an operating system instead of using software specific to the printer.

However, among printers, there are printers supporting the OS standard printing function and printers not supporting the OS standard printing function. Moreover, an OS standard printing function supporting condition of a printer and functions provided by the OS standard printing function may change in some cases.

SUMMARY OF THE INVENTION

The present invention thus provides a highly-convenient function relating to printing.

A printing control apparatus of the present invention thus includes a receiving unit which receives first print data via predetermined printing software in the case where an instruction is given to execute printing by using a printing apparatus not supporting a predetermined print function; a generating unit which generates second print data interpretable by the printing apparatus, based on the first print data; a transmitting unit which transmits the second print data to the printing apparatus, and a change control unit which executes change processing such that the receiving unit does not receive the first print data in the case where the printing apparatus is changed from a state not supporting a predetermined print function to a state capable of executing the predetermined print function, wherein the first print data generated by the predetermined printing software is transmitted to the printing apparatus in the case where an instruction is given to execute printing by using the printing apparatus which has been changed from the state not supporting the predetermined print function to the state capable of executing the predetermined print function.

According to the present invention, the user convenience in printing can be improved.

Further features of the present invention will become apparent from the following description of exemplary embodiments with reference to the attached drawings.

BRIEF DESCRIPTION OF THE DRAWINGS

FIG. 9 is a view illustrating a print environment changing step guidance dialog screen;

FIG. 10 is diagram showing the relationship of FIG. 10A and FIG. 10B;

FIG. 10A and FIG. 10B are flowcharts illustrating activation processing of printing conversion utility;

FIG. 13 is diagram showing the relationship of FIG. 13A and FIG. 13B;

FIG. 13A and FIG. 13B are flowcharts illustrating activation processing of the printing conversion utility;

DESCRIPTION OF THE EMBODIMENTS

First Embodiment

A first embodiment of the present invention is described below with reference to the drawings. Note that the following embodiments do not limit the present invention according to the scope of the claims and not all of combinations of the characteristics described in the embodiments are essential for means for solving the present invention.

Figure 1:
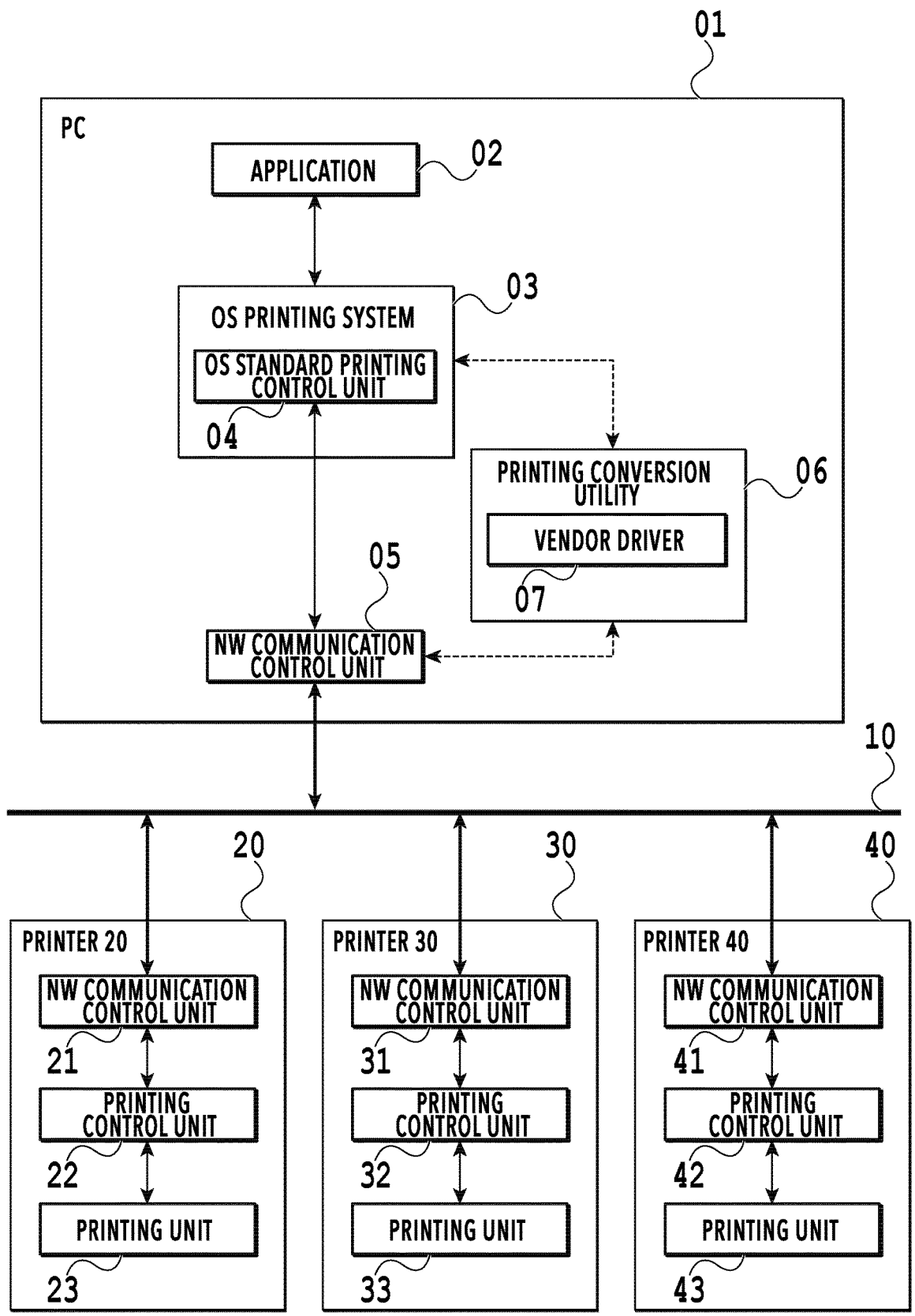
FIG. 1 is a view illustrating an overall configuration of a printing system.

FIG. 1 is a view illustrating an overall configuration of a printing system in the embodiment. A PC 01 is connected to a printer 20, a printer 30, and a printer 40 via a network 10 to be communicable with each other. The network in the embodiment is assumed to be Local Area Network (LAN) but may be Wide Area Network (WAN). Moreover, a connection mode of the network may be wired or wireless or both modes may be mixed. The PC 01 controls the printer 20, the printer 30, and the printer 40 connected thereto via the network 10.

An OS is installed in the PC 01 and manages blocks in the PC 01. In this case, the PC 01 has a hardware configuration of a general information processing apparatus. Specifically, the PC 01 includes a CPU, a ROM, a hard disk, a RAM, and various device controllers. The CPU executes programs such as the OS and applications which are stored in a program ROM in the ROM or which are loaded from the hard disk onto the RAM. Processing of the flowcharts to be described later can be implemented by executing these programs.

Moreover, the RAM functions also as a main memory, a working area, and the like of the CPU. Moreover, the PC 01 includes units such as a keyboard, a CRT display, and a disk controller (DKC) which controls data access in a hard disk (HD), a flexible disk (FD), and the like storing various types of data. Moreover, the PC 01 includes units such as a communication control unit which controls exchange of signals between the PC 01 and the connected printers. The OS installed in the PC 01 is assumed to be macOS (registered trademark) in the embodiment.

The PC 01 includes an application 02, an OS printing system 03, a printing conversion utility 06, and an NW communication control unit 05. Moreover, the printer 20, the printer 30, and the printer 40 each include an NW communication control unit 21, a printing control unit 22, and a printing unit 23. The OS printing system 03 included in the PC 01 includes an OS standard printing control unit 04 and the printing conversion utility (second print control) 06 includes a vendor driver 07. An OS standard printing function (first control mode or predetermined print function) is a standard print function (first control mode) which can control the printers. Note that processing based on the OS standard printing function is executed by using printing software initially embedded in the OS. In other words, the user basically does not have to perform an operation of installing predetermined printing software corresponding to the OS standard printing function and the PC 01 can execute the predetermined printing software corresponding to a predetermined print function. The printing conversion utility 06 is a specific print function of controlling the printers by using specific software. In other words, the manufacturer of the printer is same as the manufacturer of the vender driver.

The printing conversion utility 06 including the vendor driver 07 is used to cause a printer not supporting the OS standard printing function to perform printing. The user installs the printing conversion utility 06 including the vendor driver 07 in the PC 01 as necessary and the PC 01 can thereby instruct the printer not supporting the OS standard printing function to perform printing.

The OS printing system 03 processes print requests from the application 02 one by one as jobs. In the case where the user requests printing of application data created in the application 02, this request is inputted into the OS printing system 03 as the print job. Upon receiving the print job, the OS printing system 03 generates print data in a format based on the OS standard printing function (first print control). In the case where the printer selected in the print request from the application is a printer supporting the OS standard printing function, the OS printing system 03 transmits the generated print data to the printer via the NW communication control unit 05.

Meanwhile, in the case where the printer selected in the print request from the application is a printer not supporting the OS standard printing function, the OS printing system 03 generates the print data in the format based on the OS standard printing function and sends the generated print data to the printing conversion utility 06. Then, the printing conversion utility 06 converts the print data to a format specific to the vendor and transmits the converted print data to the printer via the NW communication control unit 05. In other words, the print data generated by the OS printing system 03 is different from the print data generated by the printing conversion utility 06.

Next, the printers are described. The printing control unit 22 receives the print data from the PC 01 via the NW communication control unit 21 and executes printing by controlling the printing unit 23 based on the print data. Note that, in the embodiment, the printer 20, the printer 30, and the printer 40 each include two cassettes of sheet feeding trays. Moreover, these printers can handle sheet sizes of A4 size, A5 size, L size, and postcard size and can handle sheet types of normal sheet, glossy photo sheet, matt photo sheet, and postcard.

The OS printing system 03 provides the OS standard printing function and, in the case where the printer supporting the OS standard printing function is selected, the user can easily perform printing without using the printing conversion utility 06. The printer supporting the OS standard printing function interprets the print data in the format based on the OS standard printing function. Moreover, the printer supporting the OS standard printing function has a function of allowing the user to register the sheet size and the sheet type of the sheets set in each sheet feeding tray of the printer to recognize the sheet size and the sheet type of the sheets set in the sheet feeding tray. In the case where the user sets the sheet size and requests for printing on a print setting screen provided by the OS printing system 03, the printer feeds a sheet from the sheet feeding tray with the same registered sheet size as the set sheet size and performs printing appropriate for the sheet type of the sheets in this sheet feeding tray.

Meanwhile, the printer not supporting the OS standard printing function cannot interpret the print data in the format based on the OS standard printing function. Moreover, the printer not supporting the OS standard printing function does not have the function of allowing the user to register the sheet size and the sheet type of the sheets set in each sheet feeding tray. Accordingly, in order to perform printing with the printer not supporting the OS standard printing function, the user has to use the printing conversion utility 06.

The user registers the sheet size and the sheet type of the sheets set in each sheet feeding tray of the printer, in the printing conversion utility 06 in advance. Then, the user sets the sheet size and requests for printing on the print setting screen provided by the OS printing system 03. The printing conversion utility 06 converts the print data in the format based on the OS standard printing function to the print data specific to the vendor based on the set sheet size and the sheet size and the sheet type of the sheets in each sheet feeding tray registered in itself and then transmits the converted print data to the printer.

In the embodiment, the printer 20 supports the OS standard printing function and the printer 30 and the printer 40 do not support the OS standard printing function. Moreover, the printer 30 not supporting the OS standard printing function is initially set to perform printing based on the print data generated via the printing conversion utility 06.

Figure 2:
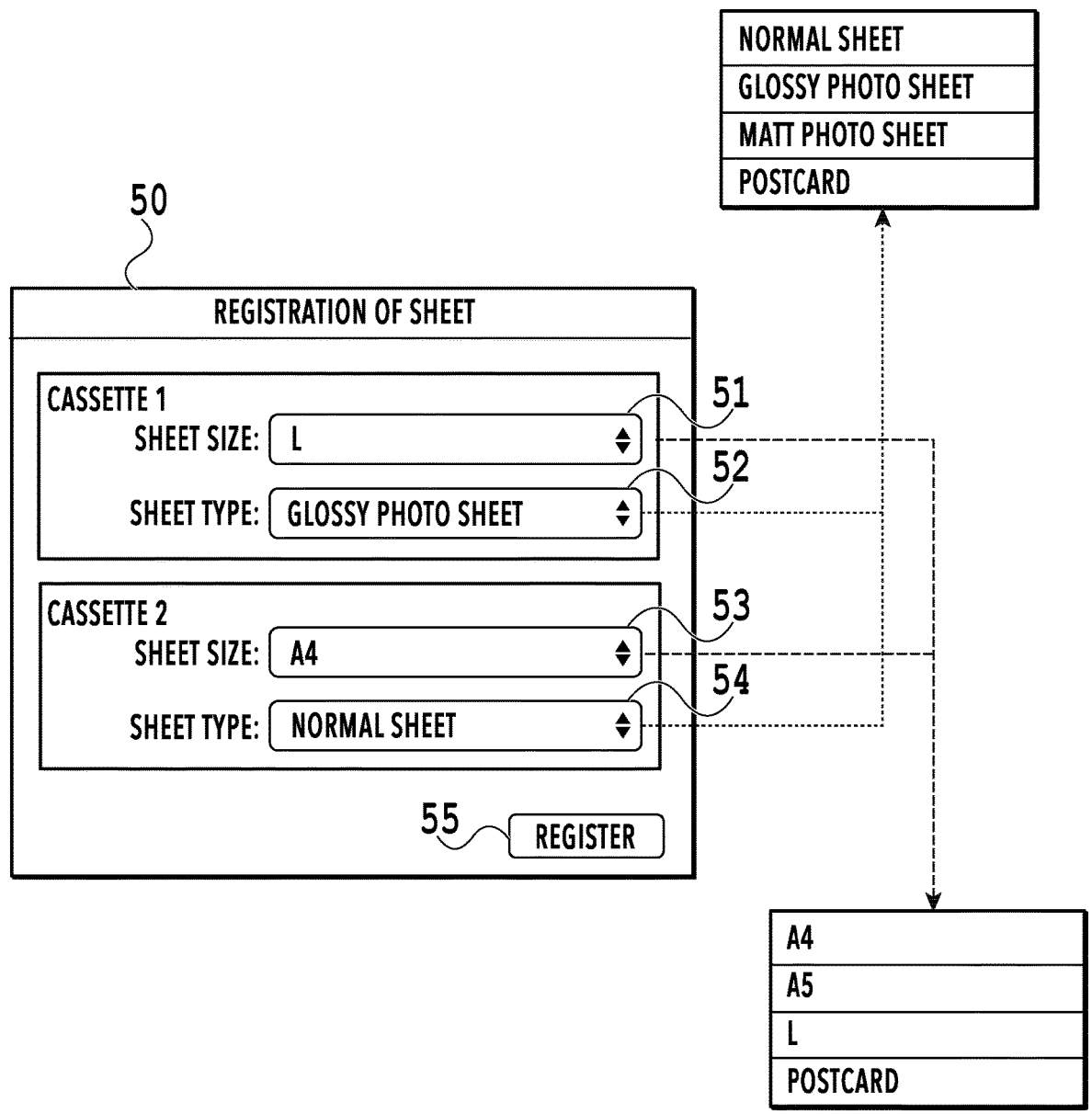
FIG. 2 is a view illustrating a sheet registration screen of a printer.

FIG. 2 is a view illustrating a sheet registration screen of the printer. The printer 20 supports the OS standard printing function as described above and includes a sheet registration screen 50 in which the user registers the sheet size and the sheet type in the case where the user sets sheets in each cassette. In the case where the printer 20 detects attaching or removing of the cassette, the printer 20 displays the sheet registration screen 50. The user can select the size and the type of the sheets set in a cassette 1 by holding down a sheet size selection menu 51 and a sheet type selection menu 52. Moreover, the user can select the size and the type of the sheets set in a cassette 2 by holding down a sheet size selection menu 53 and a sheet type selection menu 54.

In the case where the user holds down a registration button 55, the sheet size and the sheet type in each cassette selected in the sheet registration screen 50 are registered in the printer 20. In the case where the printer 20 receives the print data in the format based on the OS standard printing function, the printer 20 executes printing based on the registered sheet size and sheet type.

Figure 3:
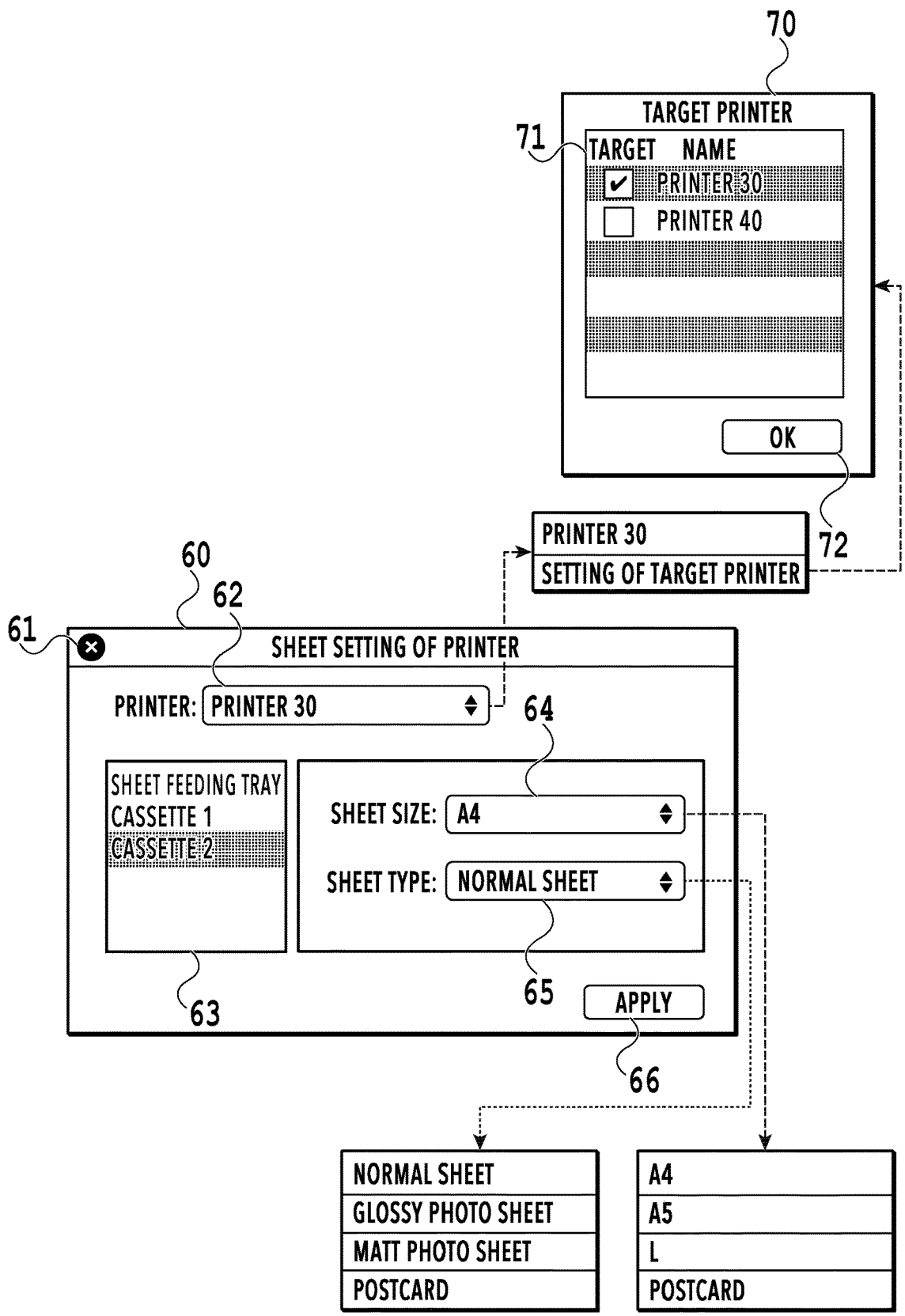
FIG. 3 is a view illustrating a printer setting screen of a printing conversion utility.

FIG. 3 is a view illustrating a printer setting screen 60 of the printing conversion utility 06. Note that FIG. 3 is displayed by activating the printing conversion utility 06. The printing conversion utility 06 includes the printer setting screen 60 used by the user to register the sheet size and the sheet type of the sheets set in each sheet feeding tray of the printer not supporting the OS standard printing function. In the case where the printing conversion utility 06 is activated, the printer setting screen 60 is displayed in a display unit of the PC 01. In the case where the user holds down a close button 61, the printing conversion utility 06 closes the printer setting screen 60 and terminates the processing.

The printing conversion utility 06 displays the name of a printer which is already set as an operation target of the printing conversion utility 06 in a printer selection menu 62 and "setting of target printer" which is an item for setting a printer being the operation target, on the printer setting screen 60. In the case where the user selects the "setting of the target printer," the printing conversion utility 06 opens a target printer setting screen 70. The target printer setting screen 70 includes a target printer list 71 and the printing conversion utility 06 displays all printers which are connected to the PC 01 and which do not support the OS standard printing function, on the target printer list 71.

In the embodiment, the printer 30 and the printer 40 not supporting the OS standard printing function are displayed. The user can check or uncheck a check box of each printer displayed in the target printer list 71 to set or unset the printer as an operation target of the printing conversion utility 06.

In the case where the user holds down an OK button 72, the printing conversion utility 06 closes the target printer setting screen 70. In the embodiment, the printer 30 not supporting the OS standard printing function is set by the user as the operation target of the printing conversion utility 06. In the case where the operation target is set, the printing conversion utility 06 obtains performance information from the printer set as the operation target. Then, the printing conversion utility 06 adds OS standard printing function support information, generated inside based on the obtained performance information, to response information to the OS printing system 03 and responds to the OS printing system 03. The user can select the sheet size and the sheet type in each sheet feeding tray of a printer by selecting this printer as the operation target in the printer selection menu 62.

The printer setting screen 60 includes a sheet feeding tray list 63 and the user can select a sheet feeding tray by using the sheet feeding tray list 63. Moreover, the printer setting screen 60 includes a size selection menu 64 and a type selection menu 65 and the user can select the size and the type in the sheet feeding tray selected in the sheet feeding tray list 63 by using the size selection menu 64 and the type selection menu 65. In the case where the user selects the sheet feeding tray, the sheet size, and the sheet type and then holds down an application button 66, the selected sheet feeding tray, sheet size, and sheet type are registered and applied to processing of the printing conversion utility 06. The printing conversion utility 06 converts the print data in the format based on the OS standard printing function sent from the OS printing system 03 to the print data in the format specific to the vendor, based on the sheet size and the sheet type registered by the user in the printer setting screen 60. Then, the printing conversion utility 06 transmits the print data to the printer 30.

Figure 4A:
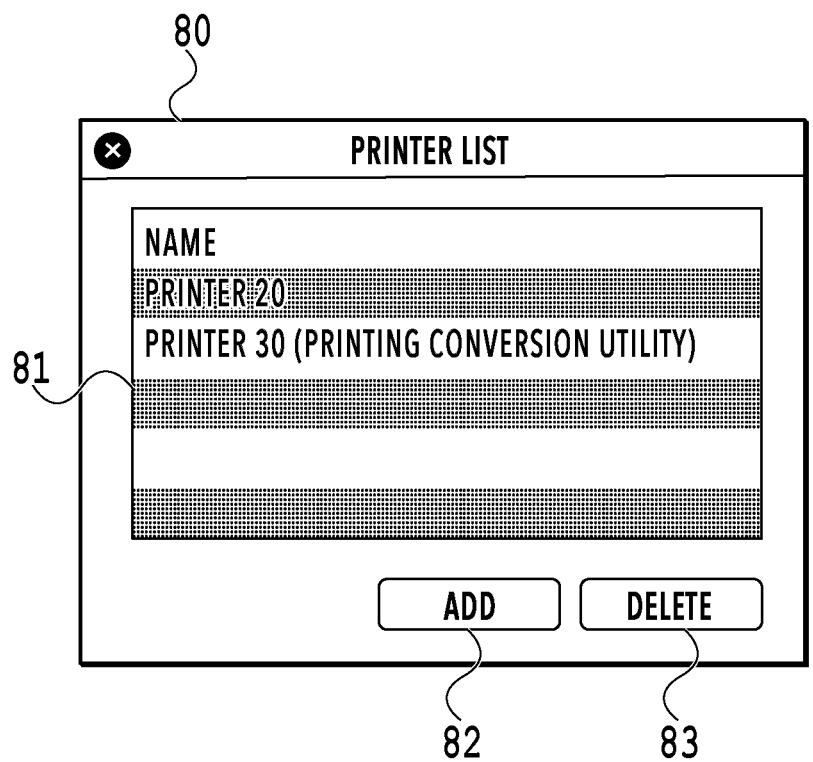
FIG. 4A is a view illustrating a printer list screen of an OS printing system.
Figure 4B:
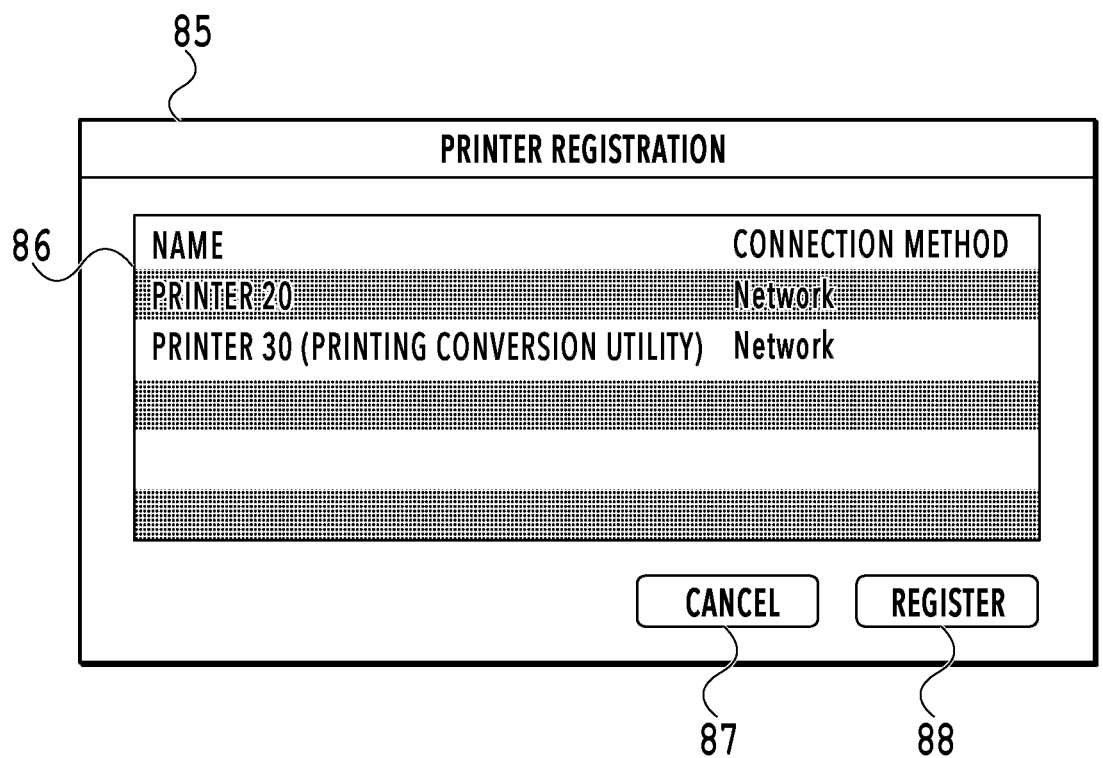
FIG. 4B is a view illustrating a printer registration screen.

FIG. 4A is a view illustrating a printer list screen 80 of the OS printing system 03 and FIG. 4B is a view illustrating a printer registration screen 85. The OS printing system 03 includes the printer list screen 80 for adding and deleting a printable printer. Moreover, the printer list screen 80 includes a printer list 81 and all printers selectable at the time of printing are displayed in the printer list 81. Note that printers registered by using the screen 85 to be described later are displayed in the printer list 81 of FIG. 4A. In the case where the user selects a printer and holds down a delete button 83 in the printer list 81, the OS printing system 03 deletes a print queue of the selected printer and deletes the selected printer from the printer list 81.

Moreover, in the case where the user holds down an add button 82, the OS printing system 03 displays the printer registration screen 85. The printer registration screen 85 includes a registration printer list 86. The OS printing system 03 displays all printers which are connected to the PC 01 via the network 10 and which support the OS standard printing function, in the registration printer list 86. The OS printing system 03 obtains performance information including the names and the OS standard printing function support information of the printer 20, the printer 30, and the printer 40 connected to the PC 01, from these printers. Then, the OS printing system 03 displays the names and connection methods of the printers supporting the OS standard printing function, in the registration printer list 86.

In the embodiment, since only the printer 20 supports the OS standard printing function, first, the OS printing system 03 displays the printer name and the connection method of the printer 20 in the registration printer list 86. Moreover, the OS printing system 03 requests the printing conversion utility 06 to obtain the performance information. As described above, in the embodiment, the printer 30 is the operation target of the printing conversion utility 06. Accordingly, the printing conversion utility 06 adds the OS standard printing function support information, generated inside based on the performance information obtained from the printer 30, to the response information and responds to the OS printing system 03. The printing conversion utility 06 adds "printing conversion utility" to the name obtained from the printer 30 so that it is possible to know that the printer 30 supports the OS standard printing function via the printing conversion utility 06. The OS printing system 03 displays "printer 30 (printing conversion utility)" and "Network" respectively as the name and the connection method of the printer 30 in the registration printer list 86, based on the response information obtained from the printing conversion utility 06.

In the case where the user selects a printer and holds down a registration button 88 in the registration printer list 86, the OS printing system 03 creates a print queue of the selected printer and displays the selected printer in the printer list 81 while closing the printer registration screen 85. Moreover, in the case where the user holds down a cancel button 87, the OS printing system 03 closes the printer registration screen 85 without registering the printer. In the embodiment, the user registers the printer 20 supporting the OS standard printing function and the printer 30 not supporting the OS standard printing function as printable printers.

Figure 5:
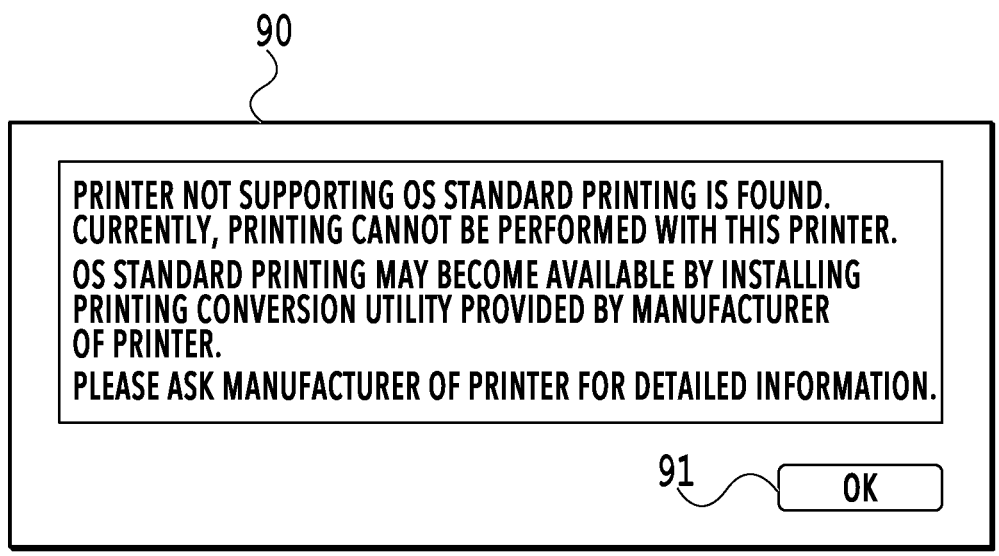
FIG. 5 is a view illustrating a printing conversion utility guidance dialog screen.
Figure 6:
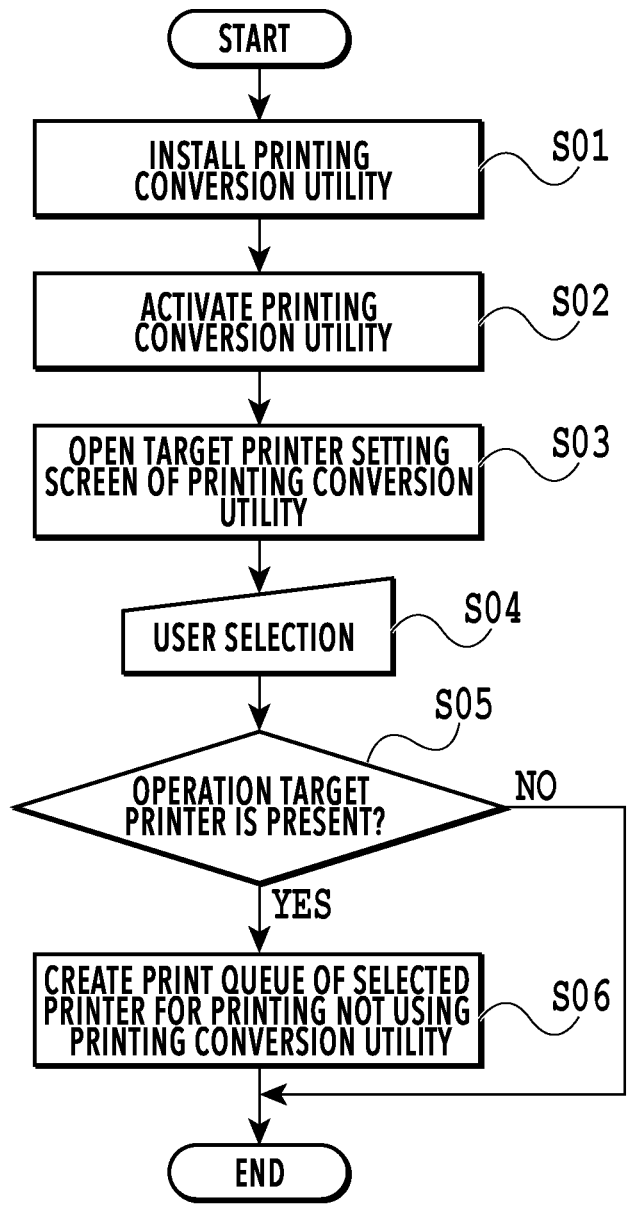
FIG. 6 is a flowchart illustrating install processing of the printing conversion utility.

Note that, in the embodiment, the printing conversion utility 06 is assumed to be already installed in the PC 01. However, in the case where the printing conversion utility 06 is not installed, the user is prompted to install the printing conversion utility 06 as necessary as illustrated in FIGS. 5 to 6 to be described later. Then, in this install processing, the print queue for performing printing by using the OS standard printing function via the printing conversion utility 06 is created. An example of this operation is described below.

FIG. 5 is a view illustrating a guidance dialog screen 90 displayed by the OS printing system 03. The OS printing system 03 searches for printers connected to the PC 01 in the case where user holds down the add button 82 in the printer list screen 80. Note that, although the printers 30 and 40 do not support the OS standard printing function, the printers 30 and 40 can respond to a search request issued by the OS printing system 03. The OS printing system 03 determines whether there is a printer not supporting the OS standard printing function by analyzing a response to the search request. In this case, if the OS printing system 03 determines that there is a printer not supporting the OS standard printing function, the OS printing system 03 displays the guidance dialog screen 90 before displaying the printer registration screen 85. In the case where the user holds down an OK button 91, the OS printing system 03 closes the guidance dialog screen 90 and opens the printer registration screen 85 illustrated in FIG. 4B.

FIG. 6 is a flowchart illustrating processing of a program (hereafter referred to as installer) for installing the printing conversion utility 06. Although not illustrated in the drawings, the user downloads an installer from a specific web server to the PC 01.

Activation of the installer by the user starts the install processing. In the case where the install processing is started, in S01, the installer installs the printing conversion utility 06 in the PC 01. As a result, the printing conversion utility 06 including the vendor driver 07 is installed in the PC 01. Thereafter, in S02, the installer activates the printing conversion utility 06. Then, in S03, the installer opens the target printer setting screen 70 of the printing conversion utility 06. In S04, a printer is selected in the target printer setting screen 70 of the printing conversion utility 06 and the installer receives hold-down of the OK button 72.

Hereafter, in the case where the printer selected by the user is connected, the printing conversion utility 06 adds the OS standard printing function support information, generated inside based on the performance information obtained from the printer, to the response information and responds to the OS printing system 03. Then, in 505, the installer checks whether the operation target printer is selected in the target printer list 71 of FIG. 3. In the case where the installer determines that the operation target printer is selected, the processing proceeds to S06. In the case where there is no operation target printer, the processing is terminated.

In S06, the installer requests the OS printing system 03 to create the print queue of the printer set as the operation target by the user. In this case, the OS printing system 03 creates the print queue for performing printing via the printing conversion utility 06 based on the response information in the response made by the printing conversion utility 06.

Figure 7:
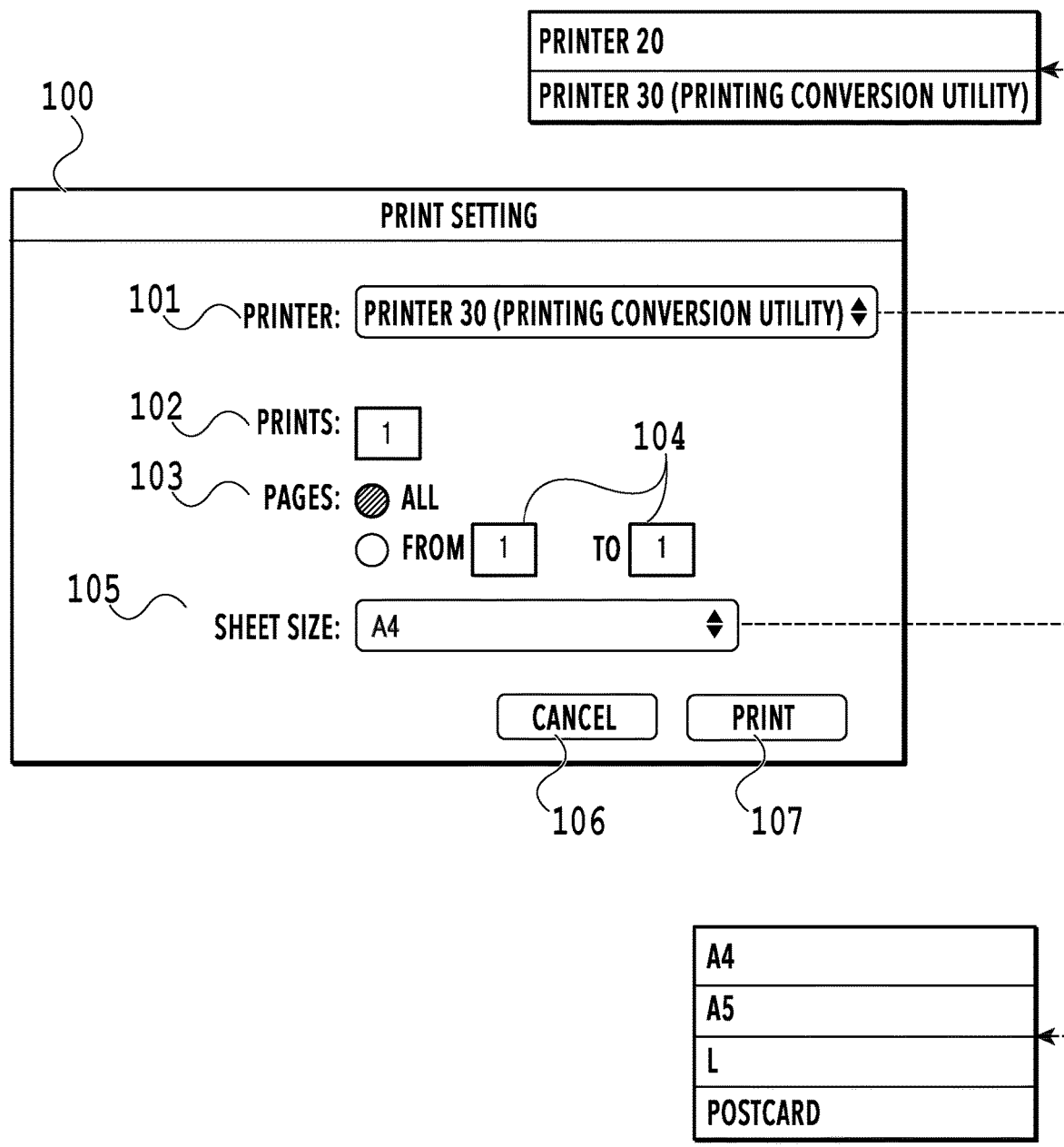
FIG. 7 is a view illustrating a print setting screen of the OS printing system.

FIG. 7 is a view illustrating a print setting screen 100 of the OS printing system 03. The OS printing system 03 includes the print setting screen 100 for printing data created in the application 02. In the case where the user requests for printing by using the application 02, the print setting screen 100 is displayed. The user can set the printer to perform printing by using a printer selection menu 101 of the print setting screen 100. The OS printing system 03 displays the printable printers added in the printer list screen 80 of FIG. 4A as selectable printers displayed in the printer selection menu 101 of the print setting screen 100. In the embodiment, the printer 20 supporting the OS standard printing function and the printer 30 not supporting the OS standard printing function are registered as the printable printers. Accordingly, these printers are displayed in the printer selection menu 101.

The user can set the number of prints in a print setting 102 included in the print setting screen 100. Moreover, the user can set pages to be printed by using a page setting radio button 103 and a page designating field 104. Furthermore, the user can set the sheet size in the printing by using a size setting menu 105 and set the sheet size to any one of A4, A5, L, and postcard printable by the printer. In the case where the user holds down a print button 107, the OS printing system 03 generates the print data based on the data outputted from the application and the settings of the print setting screen 100. Moreover, in the case where the user holds down a cancel button 106, the print job is not inputted into the OS printing system 03 and the print setting screen 100 is closed.

As described above, the printer 30 operates as the printer without the OS standard printing function. However, updating firmware of the printer 30 at a certain timing can provide the printer 30 with the OS standard printing function. As a result, the printer 30 can perform printing by using the OS standard printing function without involvement of the printing conversion utility 06. Description is given below of an example of the case in which the printer 30 is changed from a state unable to use the OS standard printing function to a state capable of using the OS standard printing function.

Figure 8:
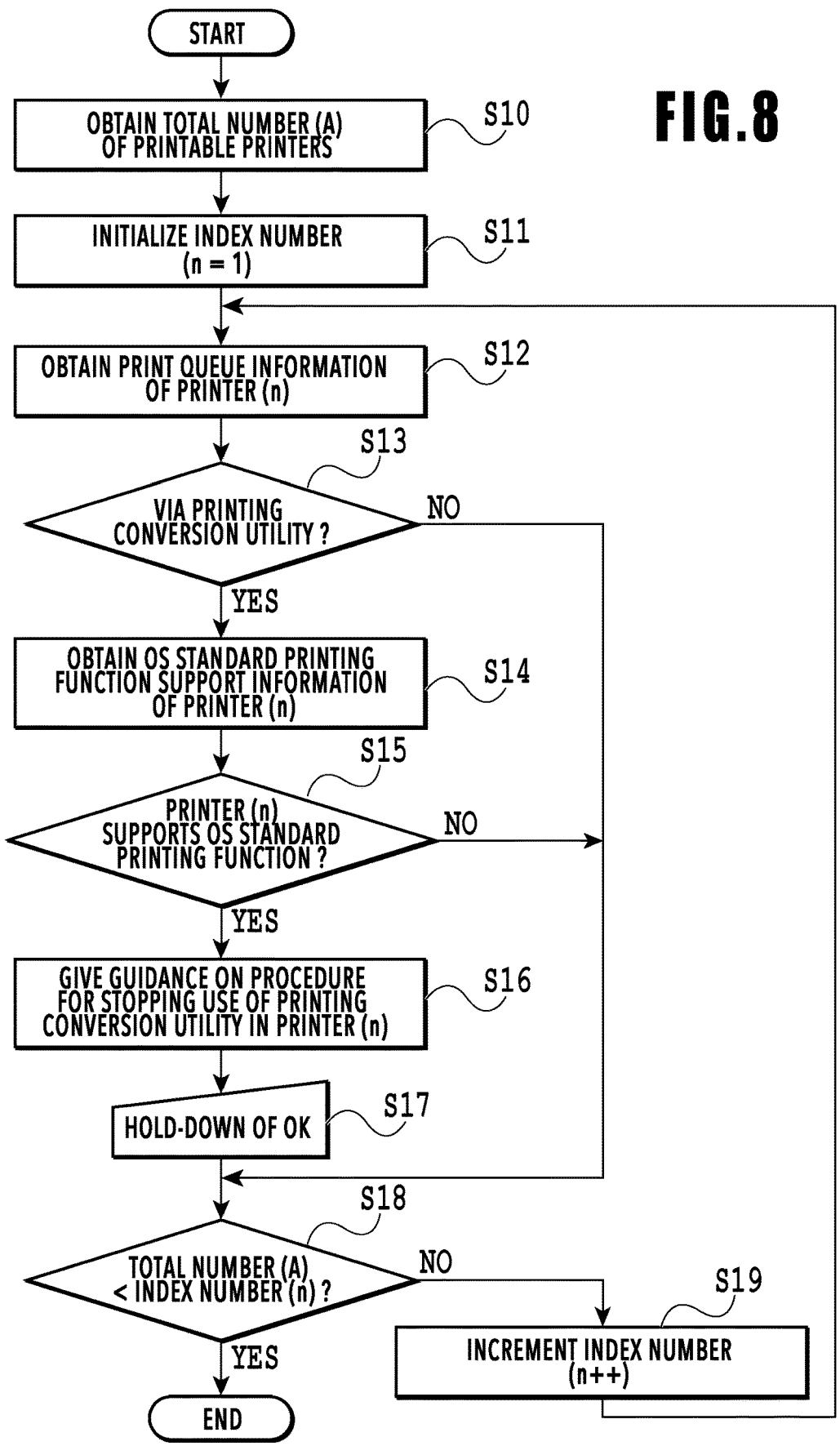
FIG. 8 is a flowchart illustrating activation processing of the printing conversion utility.

FIG. 8 is a flowchart illustrating activation processing of the printing conversion utility 06. The printing conversion utility 06 in the embodiment obtains the performance information from printers connected to the PC 01 at activation and checks whether there is a printer supporting the OS standard printing function. In the case where the printing conversion utility 06 detects a printer supporting the OS standard printing function, the printing conversion utility 06 checks whether a printer not provided with the OS standard printing function has been changed to be provided with the function. Then, in the case where there is such a printer, the printing conversion utility 06 gives guidance for procedure for using the OS standard printing function without involvement of the printing conversion utility 06.

The activation processing of the printing conversion utility 06 is described below by using the flowchart. In the case where the activation processing is started, in S10, the printing conversion utility 06 obtains the total number (A) of printable printers from the OS printing system 03. Then, in S11, the printing conversion utility 06 initializes an index number (n=1). In S12, the printing conversion utility 06 obtains information on the n-th printer 30 from the OS printing system 03. Then, in S13, the printing conversion utility 06 determines whether the n-th printer 30 is a printer which performs printing via the printing conversion utility 06, based on the obtained information. In the case where the printing conversion utility 06 determines that the n-th printer 30 is a printer which performs printing via the printing conversion utility 06 (S13—Yes), the processing proceeds to S14 and the printing conversion utility 06 obtains the OS standard printing function support information from the printer 30. In the case where the determination result is NO in S13, the processing of the printing conversion utility 06 proceeds to S18.

Thereafter, in S15, the printing conversion utility 06 determines whether the n-th printer 30 being the determination target supports the OS standard printing function. Note that, in this case, the printing conversion utility 06 determines a printer which has become capable of supporting the OS standard printing function by the update of the firmware, as the printer supporting the OS standard printing function. In the case where the printing conversion utility 06 determines that the n-th printer 30 being the determination target supports the OS standard printing function (S15—

Yes), the processing proceeds to S16 and the printing conversion utility 06 gives the guidance for procedure for using the OS standard printing function without involvement of itself. Note that the processing of S16 is an example of change processing performed to prevent the printing conversion utility 06 from receiving the print data and is implemented by a change control function of the printing conversion utility 06. In the case where the printing conversion utility 06 determines that the printer does not support the OS standard printing function (S15—No), the processing proceeds to S18 to be described later.

A guidance dialog screen 110 used in S16 is described. FIG. 9 is a view illustrating the guidance dialog screen 110. The printer 30 is changed to the state capable of supporting the OS standard printing function due to the update of the firmware and can perform printing by using the OS standard printing function without involvement of the printing conversion utility 06. In other words, the printer 30 is changed from the state unable to interpret the print data in the format based on the OS standard printing function to the state capable of interpreting this print data. Accordingly, in the embodiment, the printing conversion utility 06 gives guidance for procedure for making changes such that the printer 30 can be used without involvement of the printing conversion utility 06, on the guidance dialog screen 110.

Specifically, first, the printer 30 is disabled in the target printer setting screen 70 of the printing conversion utility 06 illustrated in FIG. 3. Next, the printer 30 is deleted from the printable printers in the printer list screen 80 illustrated in FIG. 4A. Then, guidance for adding the printer 30 again to the printable printers is given. Next, in the case where the user holds down an OK button 111 in the guidance dialog screen 110 (S17 in FIG. 8), the printing conversion utility 06 proceeds to S18 of FIG. 8.

Returning to FIG. 8, in S18, the printing conversion utility 06 determines whether the index number (n) has exceeded the total number of printable printers (A), that is whether all printable printers are checked. When the printing conversion utility 06 determines that not all of the printable printers are checked, the processing proceeds to S19 and the printing conversion utility 06 increments the index number (n++) and returns to S12 to check the next printer. When the printing conversion utility 06 determines that all printable printers are checked, the activation processing is terminated.

As described above, the printing conversion utility 06 determines whether the printer is changed to the state capable of supporting the OS standard printing function and can present operation contents to the user based on the determination result. The user operability can be thereby improved.

Second Embodiment

A second embodiment of the present invention is described below with reference to the drawings. Note that, since the basic configuration in the second embodiment is the same as that in first embodiment, only the characteristic configuration is described below.

Figure 10B:
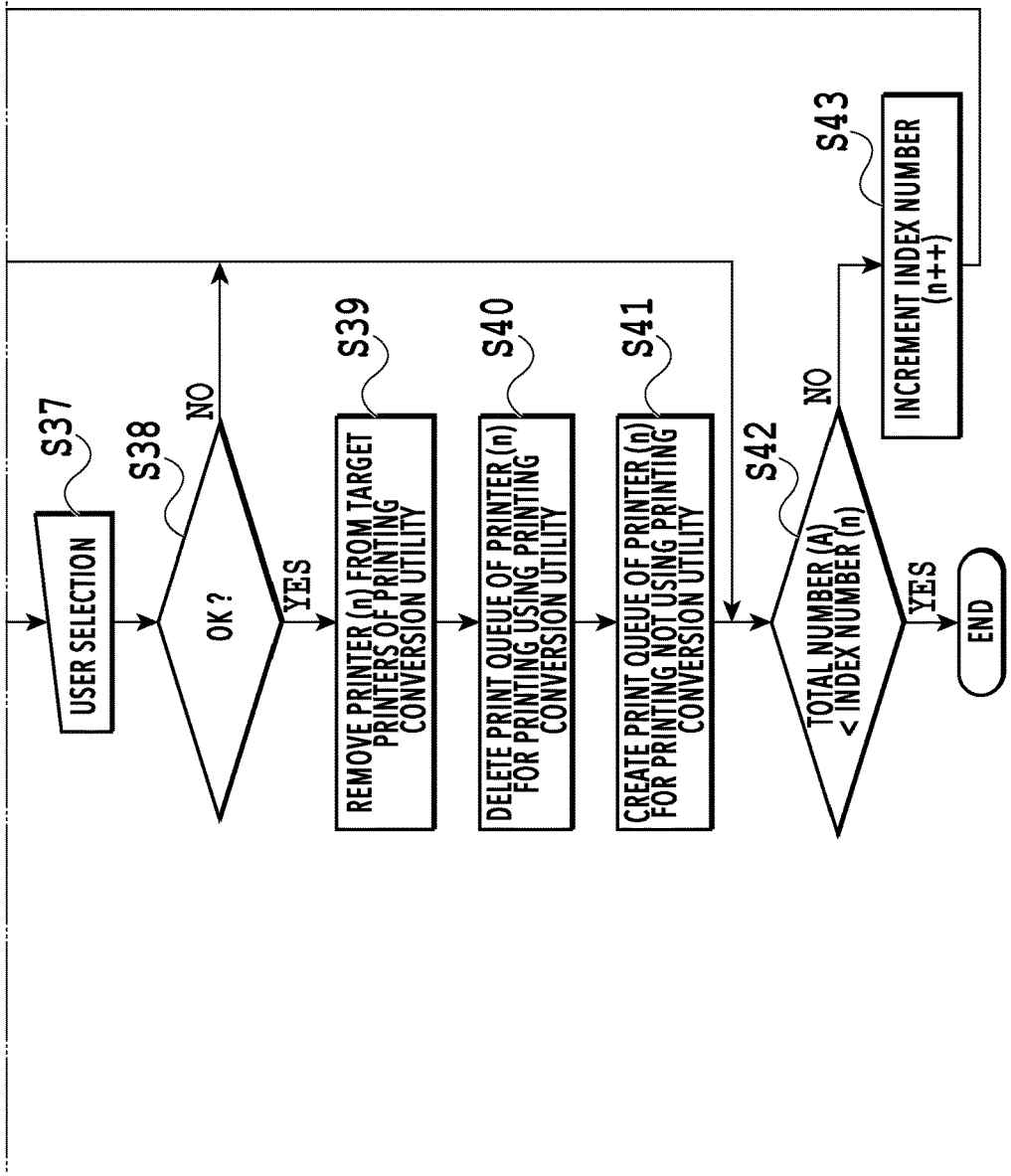
Figure 11:
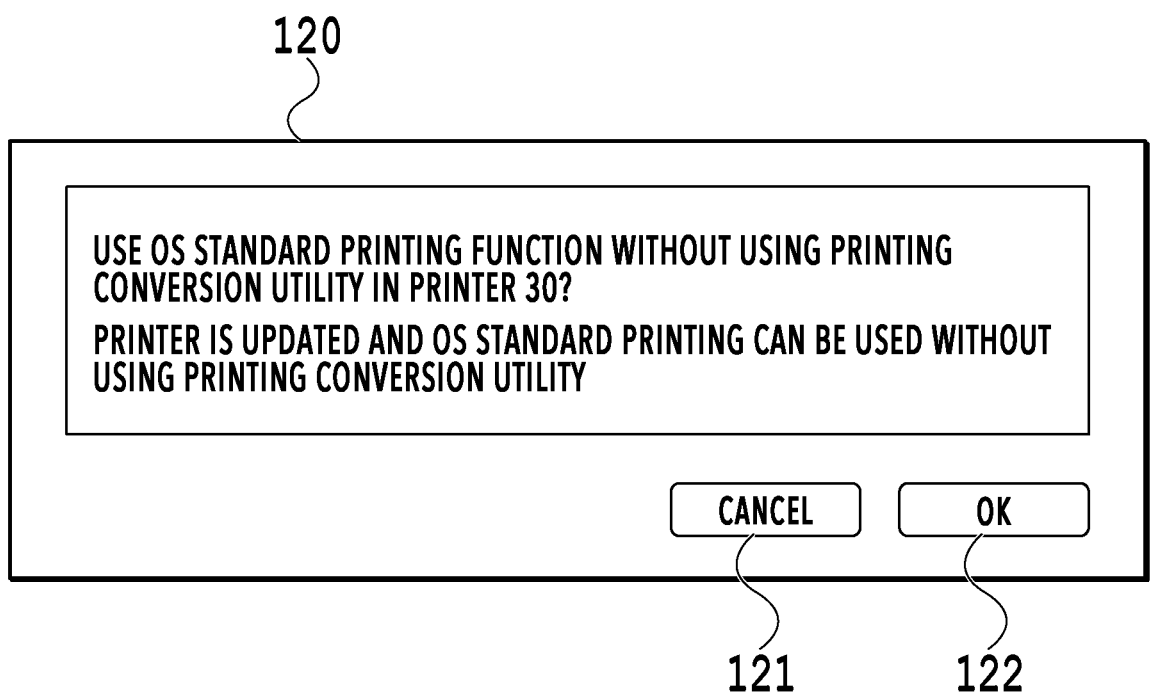
FIG. 11 is a view illustrating a print environment change notification dialog screen.

FIG. 10A and FIG. 10B are flowcharts illustrating activation processing of the printing conversion utility 06 in the embodiment and FIG. 11 is a view illustrating a notification dialog screen 120. In the embodiment, the use of the OS standard printing function without involvement of the printing conversion utility 06 is enabled without requiring the user to perform the manual operation (operation for enabling use of the OS standard printing function). The activation processing of the printing conversion utility 06 in the embodiment is described below by using the flowchart of FIG. 10A and FIG. 10B. Note that, since S30 to S35 and S42 to S43 are the same as S10 to S15 and S18 to S19 described in FIG. 8 of the first embodiment, description thereof is omitted.

In the case where the printing conversion utility 06 determines that the n-th printer 30 supports the OS standard printing function in S35, the processing of the printing conversion utility 06 proceeds to S36. Then, the printing conversion utility 06 displays the notification dialog screen 120 of FIG. 11 which notifies the user of enabling the use of the OS standard printing function without involvement of the printing conversion utility 06. In S37, the user holds down either an OK button 122 or a cancel button 121. In S38, the printing conversion utility 06 determines whether the OK button 122 of the notification dialog screen 120 is held down. In the case where the printing conversion utility 06 determines that the OK button 122 is held down, the processing proceeds to S39. In the case where the user holds down the cancel button 121, the processing proceeds to S42 to be described later. In the case where the processing proceeds from S38 to S39, the printing conversion utility 06 removes the n-th printer 30 from the operation targets of the printing conversion utility 06. Hereafter, the printing conversion utility 06 stops sending the response information of the printer (n) removed from the operation targets to the OS printing system 03 as a response.

Thereafter, in S40, the printing conversion utility 06 requests the OS printing system 03 to delete the print queue of the n-th printer 30 removed from the operation targets and delete the n-th printer 30 from the printable printers. The print queue of the printer 30 for performing printing via the printing conversion utility 06 is thereby deleted. Then, in S41, the printing conversion utility 06 requests the OS printing system 03 to create the print queue for the n-th printer 30 and register the n-th printer 30 as the printable printer (S41). By performing S41, there is created the print queue for instructing the n-th printer 30 to perform printing by using the OS standard printing function without involvement of the printing conversion utility 06.

Hereafter, the user can instruct the n-th printer 30 to perform printing by using the OS standard printing function without activating the printing conversion utility 06 and performing setting using FIG. 3. As described above, by performing S39 to S41, the change processing is performed to prevent the printing conversion utility 06 from receiving the print data. Note that this is implemented by the change control function of the printing conversion utility 06. As described above, in the case where a printer capable of performing printing by using the OS standard printing function without involvement of the printing conversion utility 06 is detected, the use of the OS standard printing function without involvement of the printing conversion utility 06 is enabled. In this case, the user does not have to perform the operation of enabling the use of the OS standard printing function without involvement of the printing conversion utility 06. The user operability can be thereby improved.

Third Embodiment

A third embodiment of the present invention is described below with reference to the drawings. Note that, since the basic configuration in the third embodiment is the same as that in first embodiment, only the characteristic configuration is described below.

Multiple functions provided by the OS standard printing function included in the OS are improved by the update of the OS and available functions vary among versions of the OS. Accordingly, some printers may not support all of the functions provided by the OS standard printing function. The functions may not be enough depending on the supporting condition of the printer and the version of the OS and enough functions sometimes become available by using the OS standard printing function via the printing conversion utility 06 and the vendor driver 07.

Meanwhile, for a user who does not use (does not need) a lacking function, using the OS standard printing function without involvement of the printing conversion utility 06 eliminates the need for the activation and setting of the printing conversion utility 06 and the user can use the OS standard printing function more easily.

Accordingly, in the embodiment, the OS standard printing function supporting condition of the printer is checked and, in the case where the OS standard printing function is not enough for the printer, the user is notified of this result. Then, the use of the OS standard printing function without involvement of the printing conversion utility 06 is enabled based on the determination of the user.

Figure 12:
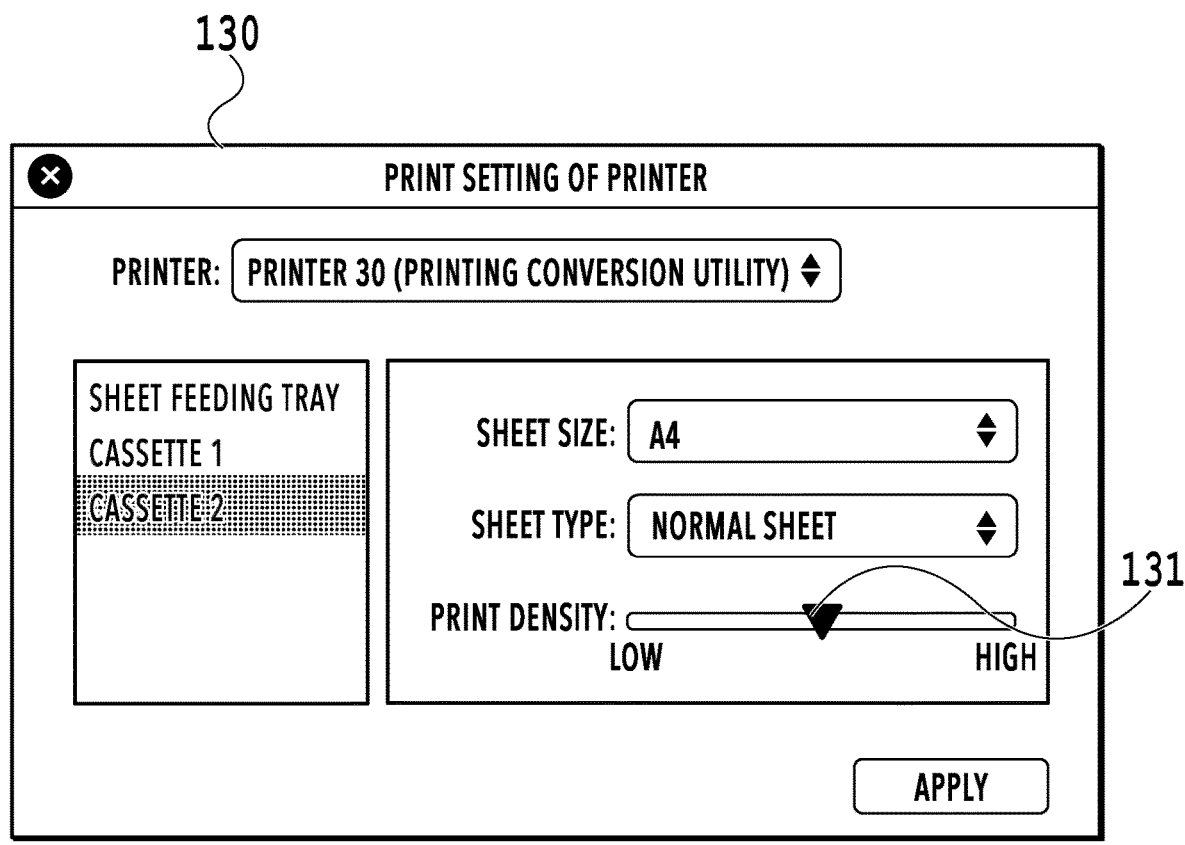
FIG. 12 is a view illustrating a printer setting screen of the printing conversion utility.

FIG. 12 is a view illustrating a printer setting screen 130 of the printing conversion utility 06 in the embodiment. The printing conversion utility 06 of the embodiment has a function of adjusting the print density as a function not included in the OS standard printing function. The printer setting screen 130 includes a print density adjustment slide bar 131 for adjusting the print density. The user can adjust the print density in printing based on the OS standard printing function executed via the printing conversion utility 06, by operating the print density adjustment slide bar 131.

Figure 13B:
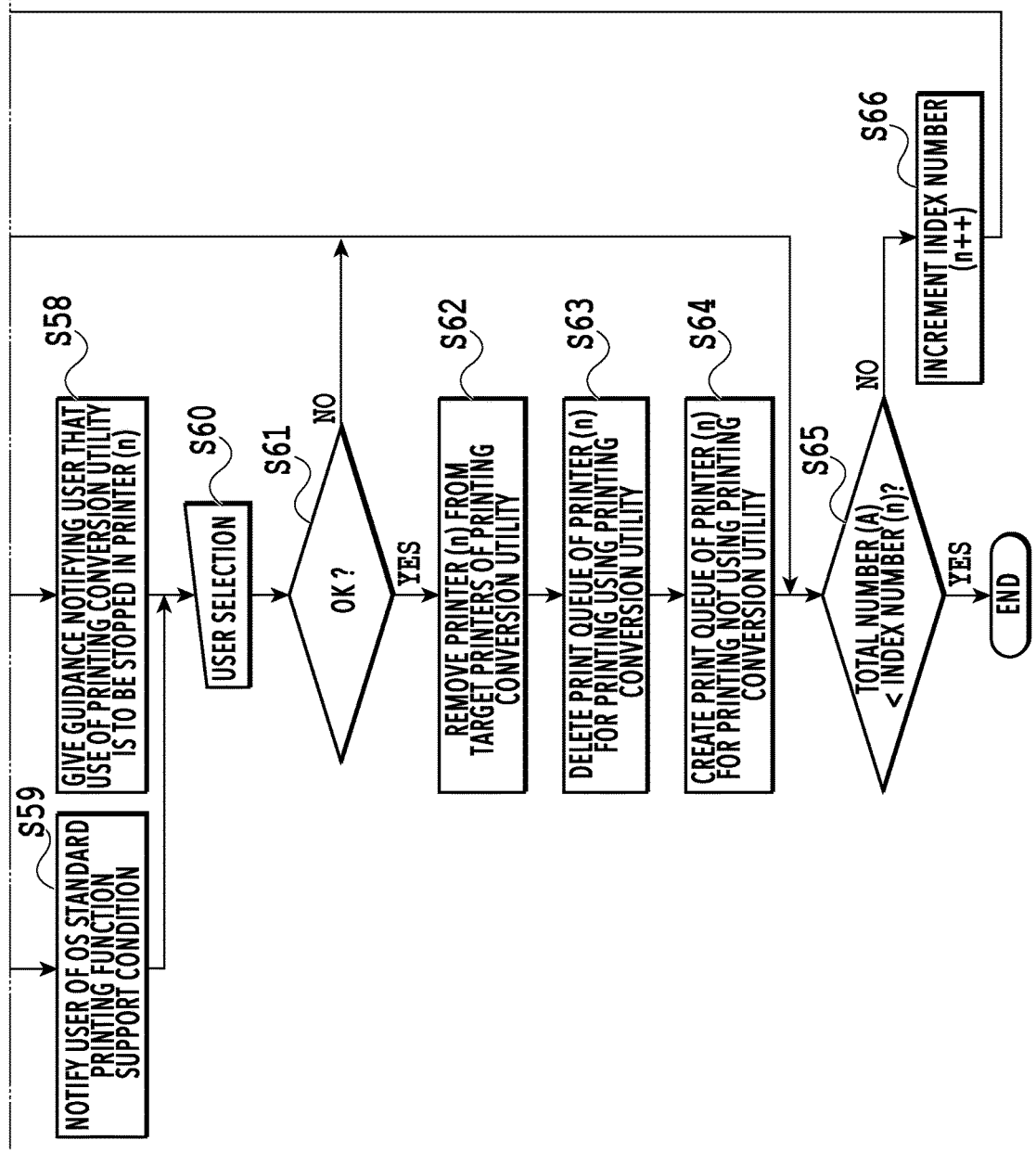

FIG. 13A and FIG. 13B are flowcharts illustrating activation processing of the printing conversion utility 06 in the embodiment. Since S50 to S55 and S60 to S66 are the same as S30 to S35 and S36, S37 to S43 described in FIG. 10A and FIG. 10B of the second embodiment, description thereof is omitted.

In the case where the printing conversion utility 06 determines that the printer 30 is updated and supports the OS standard printing function, the printing can be performed without involvement of the printing conversion utility 06. However, there may be a functional difference (difference) between the case where the OS standard printing function is used and the OS standard printing function is used via the printing conversion utility 06. Accordingly, the printing conversion utility 06 checks for the functional difference between the case where the OS standard printing function is used via the printing conversion utility 06 and the case where the OS standard printing function is used without involvement of the printing conversion utility 06 (S56). Note that S56 is executed based on the OS standard printing function support information obtained in S54 and the OS version obtained from the OS. In following S57, the printing conversion utility 06 determines whether functions in the OS standard printing function lack any function in the case where the OS standard printing function is used without involvement of the printing conversion utility 06. When the printing conversion utility 06 determines that there is a lacking function, the processing proceeds to S59. Moreover, when the printing conversion utility 06 determines that the functions are equivalent or more, the processing proceeds to S58.

Figure 14:
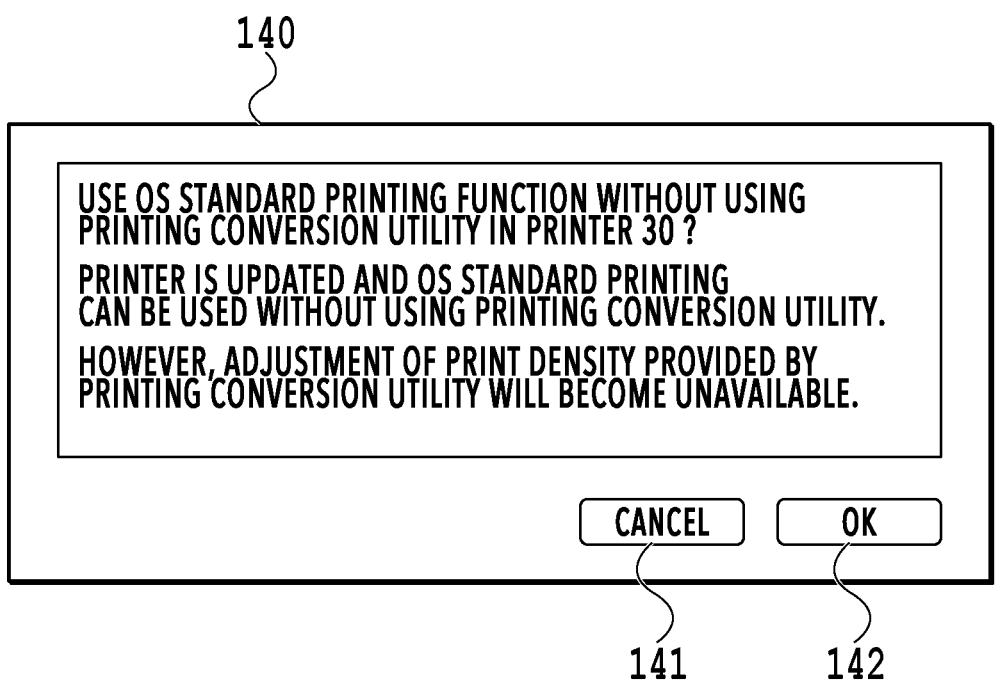
FIG. 14 is a view illustrating a condition notification dialog screen displayed in S59.

FIG. 14 is a view illustrating a notification dialog screen 140 displayed in S59. The OS standard printing function of the embodiment does not have the function of adjusting the print density included in the printing conversion utility 06. The printing conversion utility 06 notifies the user of such a lacking function on the notification dialog screen 140 and prompts the user to determine whether to change the setting to enable the use of the OS standard printing function without involvement of the printing conversion utility 06. Note that the function of adjusting the print density is an example of the lacking function and may be another function. For example, a borderless printing function or the like may be the lacking function.

Returning the flowchart of FIG. 13A and FIG. 13B, the description of the activation processing of the printing conversion utility 06 continues. In the case where the processing proceeds from S59 to S60 and the user determines that the function of adjusting the print density is unnecessary, an OK button 142 of the notification dialog screen 140 is held down. As a result, the OS standard printing function can be more easily used without the activation and setting of the printing conversion utility 06. In this case, S62 to S63 to be described later are executed. When the user determines that the function of adjusting the print density is necessary, a cancel button 141 is held down. As a result, the OS standard printing function is continuously used via the printing conversion utility 06 and the function of adjusting print density is thereby continuously used. In the case where the processing proceeds from S58 to S60, the OK button 122 or the cancel button 121 in the notification dialog screen 120 of FIG. 11 is pressed based on the determination of the user and S61 is executed by using the result of this operation.

In the embodiment, in the following S62 to S63, the printing conversion utility 06 removes the n-th printer 30 from the operation targets of the printing conversion utility 06 and deletes the print queue for performing printing by using the OS standard printing function via the printing conversion utility 06. However, the printing conversion utility 06 may not perform this processing and may leave the print queue for performing printing by using the OS standard printing function via the printing conversion utility 06 and create a print queue for performing printing by using the OS standard printing function without involvement of the printing conversion utility 06. The user can thereby use the existing print queue which requires the activation and setting of the printing conversion utility 06 only in the case of using the print density adjustment function, and use the newly-created print queue which requires no activation or setting of the printing conversion utility 06 in the case of not using the print density adjustment function.

As described above, in the case where a printer enabled to perform printing by using the OS standard printing function without involvement of the printing conversion utility 06 is detected, the printing conversion utility 06 checks for a functional difference which may occur if the setting is changed to enable the use of the OS standard printing function without involvement of the printing conversion utility. In the case where there is a functional difference, the printing conversion utility 06 notifies the user of the functional difference and prompts the user to determine whether to change the setting to enable the use of the OS standard printing function without the involvement of the printing conversion utility 06. The user operability can be thereby improved.

Fourth Embodiment

A fourth embodiment of the present invention is described below with reference to the drawings. Note that, since the basic configuration in the fourth embodiment is the same as that in first embodiment, only the characteristic configuration is described below.

In the embodiment, the printing conversion utility 06 detects the printer using the OS standard printing function without involvement of the printing conversion utility 06. Then, in the case where the printer insufficiently supports the OS standard printing function, the user is notified of this insufficient supporting and the use of the OS standard printing function via the printing conversion utility 06 is enabled based on determination of the user. Note that the printing conversion utility 06 in the embodiment includes the printer setting screen described in FIG. 12 as in the third embodiment and the user can make a registration such that the density in printing onto the sheets in each sheet feeding tray is low or high.

Figures 15, 15A:
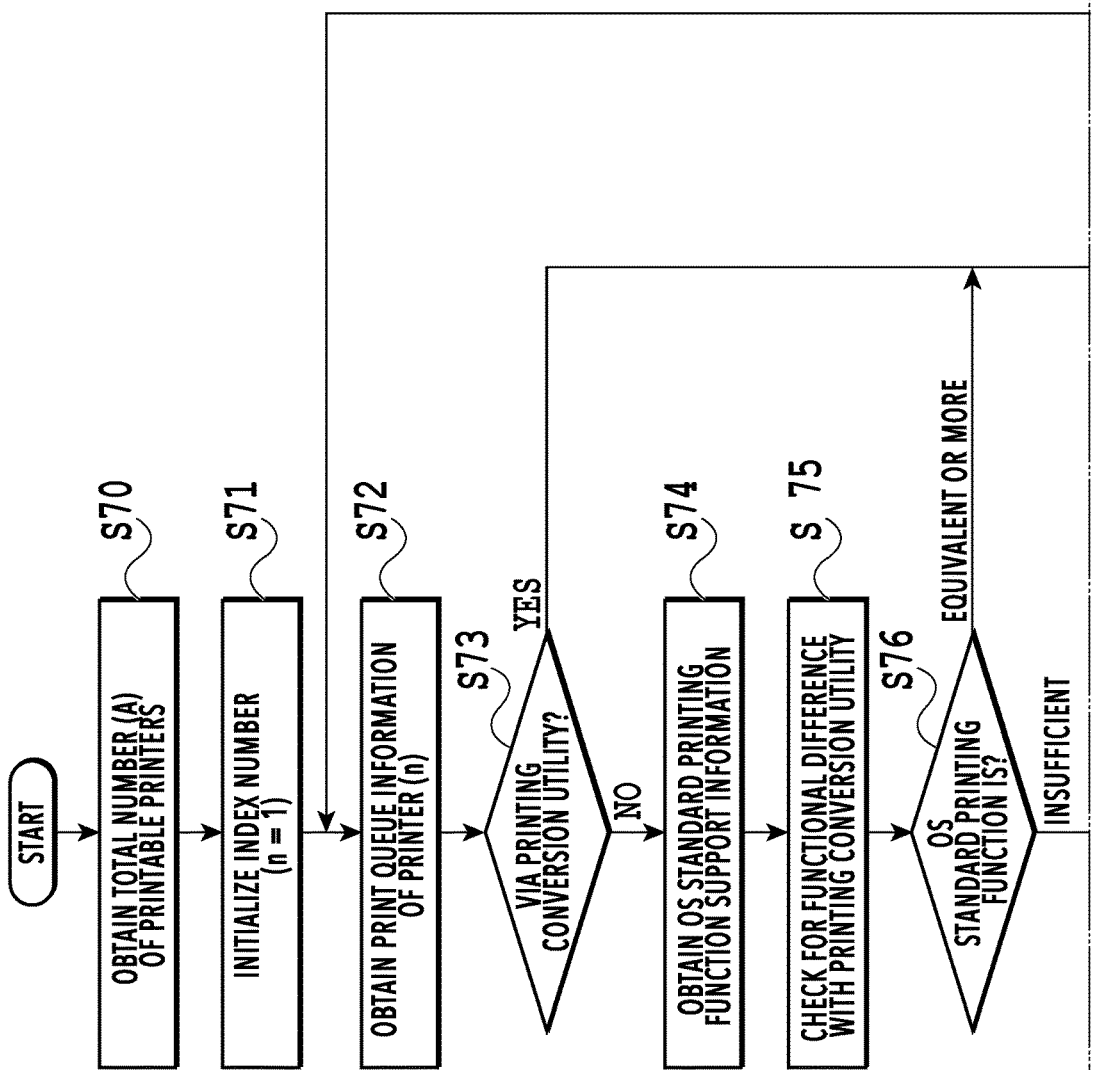
FIG. 15 is diagram showing the relationship of FIG. 15A and FIG. 15B.
FIG. 15A and FIG. 15B are flowcharts illustrating activation processing of the printing conversion utility.
Figure 15B:
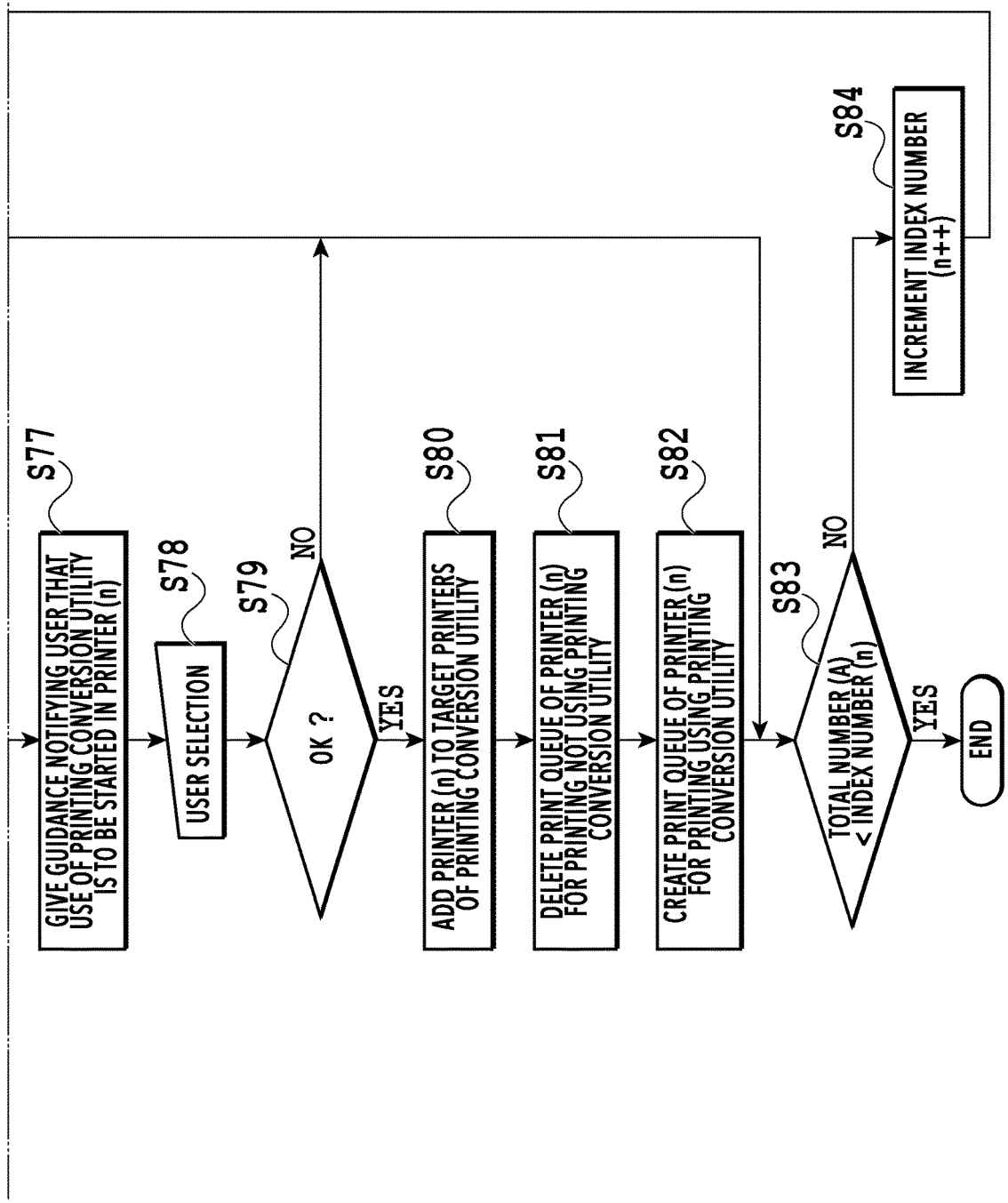

FIG. 15A and FIG. 15B are flowcharts illustrating activation processing of the printing conversion utility 06 in the embodiment. Since S70 to S72 and S83 to S84 are the same as S50 to S52 and S65 to S66 described in FIG. 13A and FIG. 13B of the third embodiment, description thereof is omitted.

In S73, the printing conversion utility 06 determines whether the n-th printer is a printer which performs printing via the printing conversion utility 06, based on the information obtained in S72. When the printing conversion utility 06 determines that the n-th printer is a printer which performs printing via the printing conversion utility 06, the processing proceeds to S83. When the printing conversion utility 06 determines that the n-th printer is not a printer which performs printing via the printing conversion utility 06, the processing proceeds to S74. The printing conversion utility 06 obtains the OS standard printing function support information from the printer (S74). The printing conversion utility 06 checks for a functional difference between the case where the OS standard printing function is used via the printing conversion utility 06 and the case where the OS standard printing function is used without involvement of the printing conversion utility 06 (S75).

Note that S75 is executed based on the OS standard printing function support information obtained from the printer and the OS version obtained from the OS. Thereafter, in the case where the printing conversion utility 06 determines that there is a lacking function if the OS standard printing function is used without involvement of the printing conversion utility 06 in S76, the processing proceeds to S77.

Figure 16:
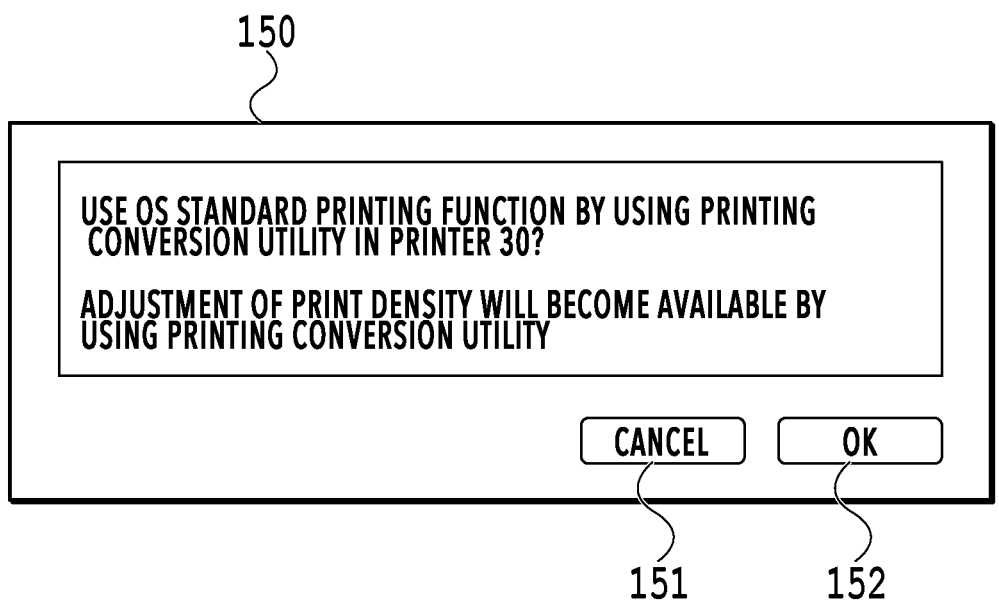
FIG. 16 is a view illustrating a printing conversion utility additional function guidance dialog screen.

FIG. 16 is a view illustrating a notification dialog screen 150 displayed in S77. In S77, the printing conversion utility 06 displays the notification dialog screen 150 of FIG. 16. The OS standard printing function of the embodiment does not have the function of adjusting the print density which is included in the printing conversion utility 06. The printing conversion utility 06 notifies the user of lacking of this function and prompts the user to determine whether to change the setting such that the OS standard printing function is used via the printing conversion utility 06.

Returning to the flowchart of FIG. 15A and FIG. 15B, the description of the activation processing of the printing conversion utility 06 continues. In S78, in the case where the user requires the print density adjustment function, the hold down of an OK button 152 is received. The print density adjustment function is thereby made available. Meanwhile, in the case where the user does not require the print density adjustment function, a cancel button 151 is held down and the OS standard printing function is continuously used without involvement of the printing conversion utility 06. The OS standard printing function can be thereby continuously used more easily without the activation and setting of the printing conversion utility 06. Thereafter, in the case where the user holds down the OK button 152 in the notification dialog screen 150 in S79, the processing proceeds to step S80. In the case where the user holds down the cancel button 151, the processing proceeds to S83.

In the case where the processing proceeds to S80, the printing conversion utility 06 determines that the OK button is held down and the user has selected the use of the OS standard printing function via the printing conversion utility 06, and enables the use of the OS standard printing function via the printing conversion utility 06. Then, the printing conversion utility 06 adds the printer to the operation targets of the printing conversion utility 06. Hereafter, the printing conversion utility 06 starts sending the performance information on the printer added to the operation targets as a response. In following S81, the printing conversion utility 06 requests the OS printing system 03 to delete the print queue of the printer 30 added to the operation targets and delete the printer 30 from the printable printers. The print queue of the printer 30 for performing printing by using the OS standard printing function without involvement of the printing conversion utility 06 is thereby deleted.

In S82, the printing conversion utility 06 requests the OS printing system 03 to create the print queue based on the performance information on the printer added to the operation targets which is sent from the printing conversion utility 06 as a response. In this step, the print queue of the printer 30 for performing printing by using the OS standard printing function via the printing conversion utility 06 is created and, hereafter, the user can use the function of adjusting the print density by using the printing conversion utility 06.

As described above, in FIG. 15A and FIG. 15B, there is performed the change processing of changing from the state where the printing conversion utility 06 does not receive the print data to the state where the printing conversion utility 06 receives the print data via predetermined printing software supporting the OS standard printing function based on the instruction to execute the printing given to the printer 30.

As described above, in the case where a printer enabled to perform printing by using the OS standard printing function without involvement of the printing conversion utility is detected, the printing conversion utility 06 changes the setting to enable use of the OS standard printing function via the printing conversion utility to check for a newly available function. Then, in the case where there is a newly available function, the printing conversion utility 06 notifies the user of this function and prompts the user to determine whether to change the setting to enable use of the OS standard printing function via the printing conversion utility 06. The user convenience can be thereby improved.

Fifth Embodiment

A fifth embodiment of the present invention is described below with reference to the drawings. Note that, since the basic configuration in the fifth embodiment is the same as that in first embodiment, only the characteristic configuration is described below.

The printing system in the embodiment is not a single apparatus and has a configuration in which the PC and the printers are connected via a certain bi-directional interface. However, the printing system is not limited to this example. Specifically, an apparatus integrated type printing system in which functions of the PC and the printer are integrated in one body may be employed as the printing system.

An object of the present invention can be also implemented as follows. First, a storage medium storing a program code of software which implements the functions of the aforementioned embodiments is supplied to a system or an apparatus. Then, a computer (or CPU or MPU) reads and executes the program code stored in the storage medium.

In this case, the program code itself read from the storage medium implements the aforementioned functions of the embodiments. Moreover, the storage medium storing the program code forms the present invention.

For example, a flexible disk, a hard disk, an optical disc, an magneto-optical disk, a CD-ROM, a CD-R, a magnetic tape, a non-volatile memory card, a ROM, a DVD, and the like can be used as the storage medium for supplying the program code.

Moreover, the aforementioned functions of the embodiment are implemented not only by the computer executing the read program code. Specifically, the present invention includes the case where an OS or the like operating on the computer performs all or part of actual processing based on instructions of the program code and the aforementioned functions of the embodiments are implemented through this processing.

Moreover, the present invention also includes the following case. The program code read from the storage medium is written in a memory included in a function expansion board inserted in a computer or a function expansion unit connected to a computer. Then, a CPU or the like included in the function expansion board or the function expansion unit performs all or part of the actual processing based on instructions of the program code and the aforementioned functions of the embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-202765, filed Oct. 29, 2018, which is hereby incorporated by reference wherein in its entirety.

What is claimed is:

1. A printing control apparatus comprising:
one or more processors; and
one or more memories storing instructions that, when executed by the one or more processors, cause the printing control apparatus to:
register a printing apparatus in print conversion software; and
add predetermined information based on the print conversion software to name information of the registered printing apparatus,
wherein the name information of the printing apparatus and the predetermined information are displayed on a setting screen provided by predetermined printing software as a name of the printing apparatus,
the predetermined printing software operates in the printing control apparatus,
in a case where the name of the printing apparatus is selected on the setting screen in which the name information of the printing apparatus and the predetermined information are displayed as the name of the printing apparatus and an instruction to execute printing is given, first print data in a first format is received via the predetermined printing software and second print data in a second format different from the first format is generated based on the first print data, and the second print data is transmitted to the printing apparatus.

2. The printing control apparatus according to claim 1, wherein the predetermined printing software is embedded in an operating system of the printing control apparatus without requiring a user to perform an installing operation.

3. The printing control apparatus according to claim 1, wherein the one or more memories store the instructions that, when executed by the one or more processors, further cause the printing control apparatus to:
request an operating system (OS) to create a print queue of the printing apparatus based on the registering of the printing apparatus.

4. The printing control apparatus according to claim 1, wherein the one or more memories store the instructions that, when executed by the one or more processors, further cause the printing control apparatus to:
execute change processing such that the first print data is not received in the case where the printing apparatus is changed from a state not supporting a predetermined print function provided by the predetermined printing software to a state capable of executing the predetermined print function, and
wherein the first print data generated by the predetermined printing software is transmitted to the printing apparatus in the case where an instruction is given to execute printing by using the printing apparatus which has been changed from the state not supporting the predetermined print function to the state capable of executing the predetermined print function.

5. The printing control apparatus according to claim 1, wherein the one or more memories store the instructions that, when executed by the one or more processors, further cause the printing control apparatus to:
set print setting information relating to borderless printing, and
wherein the second print data is generated based on the first print data and the print setting information.

6. A method of controlling a printing control apparatus comprising one or more processors and one or more memories storing instructions, the method comprising:
registering a printing apparatus in print conversion software; and
adding predetermined information based on the print conversion software to name information of the registered printing apparatus,
wherein the name information of the printing apparatus and the predetermined information are displayed on a setting screen provided by predetermined printing software as a name of the printing apparatus,
the predetermined printing software operates in the printing control apparatus,
in a case where the name of the printing apparatus is selected on the setting screen in which the name information of the printing apparatus and the predetermined information are displayed as the name of the printing apparatus and an instruction to execute printing is given, first print data in a first format is received via the predetermined printing software and second print data in a second format different from the first format is generated based on the first print data, and the second print data is transmitted to the printing apparatus.

7. The method according to claim 6, wherein the predetermined printing software is embedded in an operating system of the printing control apparatus without requiring a user to perform an installing operation.

8. The method according to claim 6, further comprising requesting an operating system (OS) to create a print queue of the printing apparatus based on the registering of the printing apparatus.

9. The method according to claim 6, further comprising executing change processing such that the first print data is not received in the case where the printing apparatus is changed from a state not supporting a predetermined print function provided by the predetermined printing software to a state capable of executing the predetermined print function, wherein the first print data generated by the predetermined printing software is transmitted to the printing apparatus in the case where an instruction is given to execute printing by using the printing apparatus which has been changed from the state not supporting the predetermined print function to the state capable of executing the predetermined print function.

10. The method according to claim 6, further comprising setting print setting information relating to borderless printing, wherein the second print data is generated based on the first print data and the print setting information.

11. A non-transitory storage medium storing a program relating to a method of controlling a printing control apparatus including one or more processors and one or more memories storing instructions, the method including:

registering a printing apparatus in print conversion software; and adding predetermined information based on the print conversion software to name information of the registered printing apparatus, wherein the name information of the printing apparatus and the predetermined information are displayed on a setting screen provided by predetermined printing software as a name of the printing apparatus, the predetermined printing software operates in the printing control apparatus, in a case where the name of the printing apparatus is selected on the setting screen in which the name information of the printing apparatus and the predetermined information are displayed as the name of the printing apparatus and an instruction to execute printing is given, first print data in a first format is received via the predetermined printing software and second print data in a second format different from the first format is generated based on the first print data, and the second print data is transmitted to the printing apparatus.

12. The non-transitory storage medium according to claim 11, wherein the predetermined printing software is embedded in an operating system of the printing control apparatus without requiring a user to perform an installing operation.

13. The non-transitory storage medium according to claim 11, wherein the method further includes requesting an operating system (OS) to create a print queue of the printing apparatus based on the registering of the printing apparatus.

14. The non-transitory storage medium according to claim 11, wherein the method further includes executing change processing such that the first print data is not received in the case where the printing apparatus is changed from a state not supporting a predetermined print function provided by the predetermined printing software to a state capable of executing the predetermined print function, and wherein the first print data generated by the predetermined printing software is transmitted to the printing apparatus in the case where an instruction is given to execute printing by using the printing apparatus which has changed from the state not supporting the predetermined print function to the state capable of executing the predetermined print function.

15. The non-transitory storage medium according to claim 11, wherein the method further comprises setting print setting information relating to borderless printing, and wherein the second print data is generated based on the first print data and the print setting information.

* * * * *